July 26, 1938.  E. S. COOK ET AL  2,125,101
FLUID PRESSURE BRAKE CONTROL MECHANISM
Filed May 12, 1937
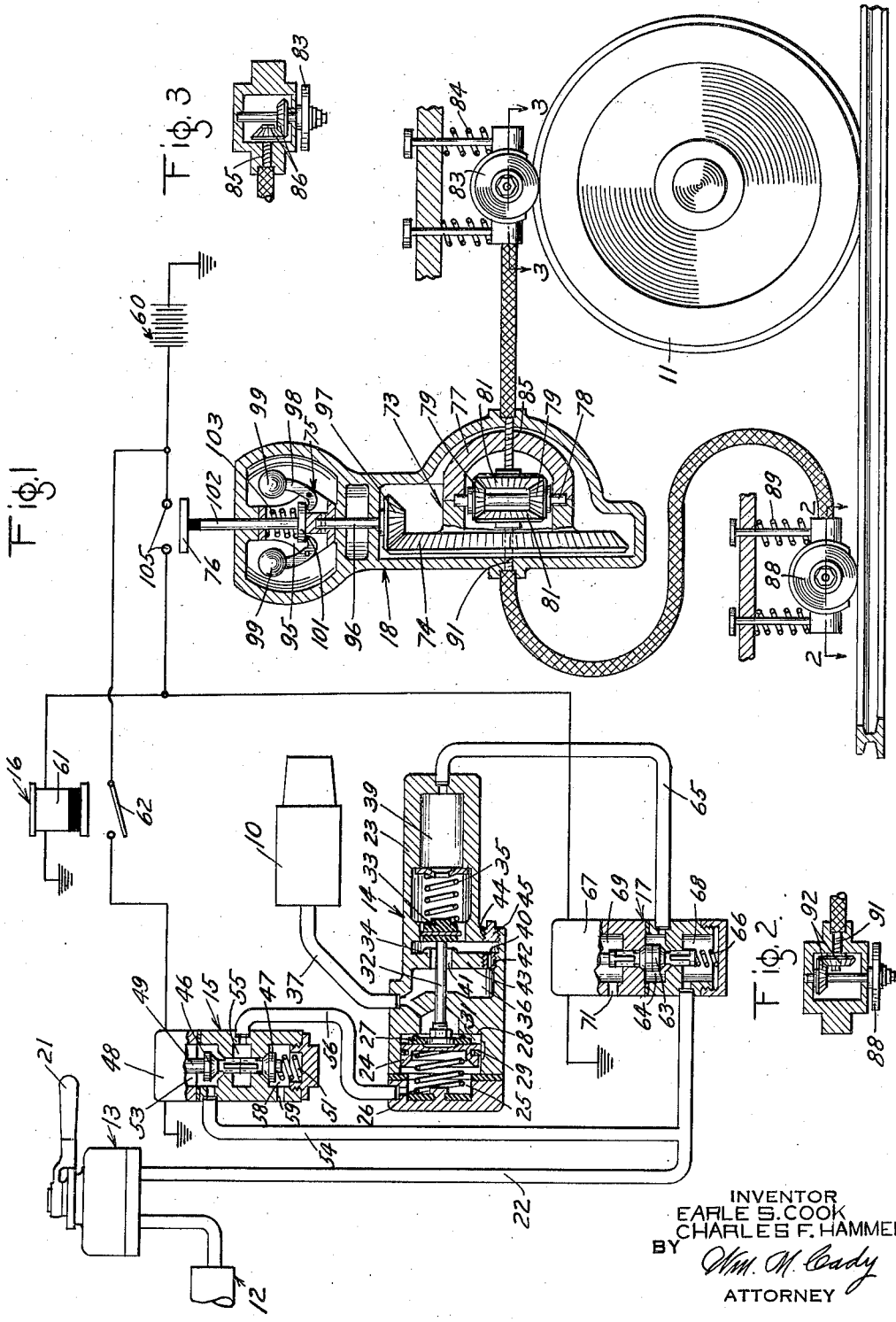
INVENTOR
EARLE S. COOK
CHARLES F. HAMMER
BY
Wm. M. Cady
ATTORNEY Patented July 26, 1938

2,125,101

UNITED STATES PATENT OFFICE 2,125,101

FLUID PRESSURE BRAKE CONTROL MECHANISM

Earle S. Cook, Wilkinsburg, and Charles F. Hammer, Greensburg, Pa., assignors to The Westinghouse Air Brake Company, Wilmerding, Pa., a corporation of Pennsylvania Application May 12, 1937, Serial No. 142,150

12 Claims. (Cl. 303—21)

This invention relates to fluid pressure brake control mechanisms, and particularly to brake control mechanisms including means for guarding against sliding of the vehicle wheels.

The term "sliding" as employed herein with reference to vehicle wheels refers to the dragging of a vehicle wheel along a road surface or rail while the wheel is in a locked state, as distinguished from "slipping" of the vehicle wheel which term is employed herein to designate the rotation of a vehicle wheel at a speed less than a rotative speed corresponding to vehicle speed, as when decelerating toward a locked condition. The interval of time which elapses from the instant that a vehicle wheel begins to slip to the instant that it attains a locked condition is referred to herein as the "slipping time" or "slipping period".

Various devices have been proposed which are effective upon slipping of a vehicle wheel to cause a release of fluid under pressure from a brake cylinder so as to release the brakes on the slipping wheel and thus enable it to return to a rotative speed corresponding to vehicle speed, and thereby prevent sliding of the wheel. With but few known exceptions, however, such devices are effective to restore the original brake cylinder pressure which initiated the slipping of the wheel, when a vehicle wheel returns toward a speed corresponding to vehicle speed following the slipping thereof. In view of the fact that the vehicle speed is constantly reducing and, consequently, that the coefficient of friction between the brake shoes and the rim of the vehicle wheels or brake drum on the vehicle wheels is accordingly increasing, the retarding force exerted on the vehicle wheel for a given degree of brake cylinder pressure or braking force is correspondingly increased upon the reapplication of the brakes. As a result, the restoration of the original brake cylinder pressure which initiated slipping of the wheel is very likely to cause recurrence of slipping unless the condition of the road surface changes in the meantime to such an extent that the coefficient of adhesion between the rim of the vehicle wheel and the road surface can sustain the restored retarding force on the vehicle wheels without slipping.

It is, therefore, desirable to limit the degree of braking force or brake cylinder pressure restored, following a slipping of a vehicle wheel, to a value which is lower than that which initiated the slipping of the wheel in order to minimize the likelihood of recurrence of the slipping of the wheel and thus avoid the consequent unnecessary wastage of fluid pressure due to repeatedly exhausting the brake cylinder between reapplications. A brake control equipment adapted to function in such manner is disclosed in the copending application, Serial No. 141,106, of Edgar A. Work and Charles F. Hammer, the latter being one of the present joint applicants, filed May 6, 1937 and assigned to the same assignee as the present application.

It is an object of our invention to provide a brake control equipment of different construction than that disclosed in the above-mentioned application and adapted to release the brakes on a slipping wheel and effect restoration of the application of the brakes in a novel manner when the vehicle wheel returns to a speed corresponding substantially to vehicle speed so as to minimize the likelihood of recurrence of wheel-slipping.

Another object of our invention is to provide a brake control equipment, of the character indicated in the foregoing object, adapted to control the restoration of braking force, following the slipping of a wheel, in a manner so as to cause an initial rapid increase in the braking force until a certain uniform braking force is attained and then further increasing the braking force only at a relatively slow rate.

The above objects, and other objects of our invention which will be made apparent hereinafter, are obtained by an illustrative embodiment shown in the accompanying drawing, wherein, Fig. 1 is a diagrammatic simplified view, with parts in section, of a brake equipment embodying our invention, Fig. 2 is a fragmentary sectional view, taken on the line 2—2 of Fig. 1, and Fig. 3 is a fragmentary sectional view, taken on the line 3—3 of Fig. 1.

Description

Referring to Fig. 1, the equipment shown comprises a brake cylinder 10 operative to apply the brakes to a vehicle wheel 11, a source of supply for fluid under pressure, such as a main reservoir 12, a brake valve device 13 of any suitable type for controlling the supply of fluid under pressure from the reservoir 12 to the brake cylinder 10, an inshot valve device 14, a magnet valve device 15 for controlling the operation of the inshot valve device 14, a quick-pick-up and slow-opening relay 16 for controlling the magnet valve device 15, a release magnet valve device 17 operative to effect the release of fluid under pressure from the brake cylinder, and a device 18, hereinafter called the wheel-slip detector, for controlling the relay 16 and the magnet valve device 17.

The brake valve device 13 has an operating handle 21 which controls the operation of valve mechanism (not shown) in the brake valve so as to establish, in the brake release position, a communication connecting a pipe 22 to atmosphere, and operative out of the release position to establish communication through which fluid under pressure is supplied from the reservoir 12 into the pipe 22 to any desired degree up to the maximum or normal pressure carried in the reservoir. The brake valve device 13 is preferably of a self-lapping type so that a pressure may be established and maintained in pipe 22 according to the degree of movement of the handle 21 out of its release position into an application zone.

The inshot valve device 14 comprises a casing 23 containing a movable abutment such as a piston 24. At one side of the piston 24 is a chamber 25, the supply of fluid under pressure to and the release of fluid under pressure from which is under the control of the magnet valve device 15. A biasing spring 26 contained in the chamber 25 and interposed between the piston 24 and the casing 23 yieldingly urges the piston 24 in the right-hand direction to cause an annular gasket 27 on the piston to seat on an annular shoulder 28 formed in the casing. A pressure equalizing or feed groove 29 in the casing is effective to establish communication between the chamber 25 and a chamber 31 at the outer seated area of the piston.

The piston 24 has a stem 32, suitably guided in the casing, the end of which is adapted to engage a check valve 33 and unseat it from an annular rib seat 34 against the resisting force of a relatively lightly tensioned return spring 35.

When the check valve 33 is unseated in the manner shown, communication is established through a relatively large passage 41 between a chamber 39 and a chamber 36 which is open to the inner seated area of the piston 24 and which is constantly connected to the brake cylinder 10 through a passage and pipe 37.

A choke fitting 42 having a restricted passage 40 is fixed in the wall 43 between the chambers 36 and 39 and enables the flow of fluid under pressure from chamber 39 to chamber 36 and the connected brake cylinder 10 at a restricted rate, when the large passage 41 is closed by the seating of the check valve 33 on the annular rib seat 34, for a purpose which will be made apparent hereinafter.

In order to provide other choke plugs, similar to the choke plug 42 but having restricted passages therein of different flow areas than the restricted passage 40, an opening 44 is provided in the casing in coaxial alignment with the choke fitting 42, a removable plug, such as the screw plug 45, being provided for closing the opening normally.

The magnet valve device 15 comprises a pair of oppositely seating valves 46 and 47, hereinafter respectively called the supply valve and the release valve, and an electromagnet 48 effective when energized to actuate a plunger or stem 49 to shift the valves 46 and 47 simultaneously from their normal unseated and seated positions against the force of a yielding spring 51 to seated and unseated positions respectively.

With the electromagnet 48 deenergized and the supply valve 46 and release valve 47 accordingly in unseated and seated positions respectively, communication is established past the supply valve 46 from a chamber 53, which is constantly connected to the supply pipe 22 by a branch pipe 54, to a chamber 55 which is constantly connected to the chamber 25 of the inshot valve 14 by a pipe 56. Accordingly, it will be seen that with the electromagnet 48 of the magnet valve device 15 deenergized, the operation of the brake valve 13 to supply fluid under pressure into the pipe 22 causes fluid under pressure to be supplied to the chamber 25 of the inshot valve device.

When the electromagnet 48 of the magnet valve device 15 is energized and the supply valve and release valve accordingly shifted to seated and unseated positions respectively, the supply communication just described is cut off and a release communication is established for exhausting fluid under pressure from the chamber 25 of the inshot valve device by way of the chamber 55 and past the unseated release valve to a chamber 58 which is constantly open to atmosphere through a port 59.

The relay 16 comprises a suitable winding 61 which is effective when energized to cause a contact member 62 to be rapidly shifted from a normal circuit-opening position to a circuit-closing position for completing an energizing circuit for the electromagnet 48 which circuit includes a source of current such as a battery 60. The relay 16 is further adapted so that, upon deenergization of the winding 61, the contact member 62 remains in circuit-closing position for a certain uniform length of time before shifting to circuit-opening position. The relay 16 may be designed so that the time delay occurring before the contact member 62 shifts to circuit-opening position following deenergization of the winding 61 may be made any desired length of time, such as twenty or thirty seconds. The function of the relay 16 will be made clear hereinafter.

The magnet valve device 17 comprises a double beat valve 63 contained in a chamber 64 which is constantly connected, through a pipe 65, to the chamber 39 of the inshot valve device 14, the double beat valve being normally yieldingly urged to an upper seated position by a biasing spring 66 and actuated downwardly against the force of the spring 66 to a lower seated position upon energization of an electromagnet 67. In its upper seated position, the double beat valve 63 establishes communication past its open lower seat from the chamber 64 to a chamber 68 to which the supply pipe 22 is constantly connected.

Accordingly, it will be seen that with the electromagnet 57 of the magnet valve device 17 deenergized and the double beat valve 63 correspondingly in its upper seated position, communication is established through which fluid under pressure may be supplied from the supply pipe 22 to chamber 39 of the inshot valve device 14 and then to the brake cylinder 10.

When the electromagnet 67 of the magnet valve device 17 is energized and the double beat valve 63 is correspondingly shifted to its lower seated position, the supply communication to the brake cylinder just described is closed and communication is established past the open upper seat of the double beat valve from the chamber 64 to a chamber 69 which is constantly open to atmosphere through a port 71. Thus fluid under pressure may be released from the brake cylinder 10 while maintaining the pipe 22 charged with fluid under pressure.

The wheel-slip detector 18 comprises a casing containing a differential gear mechanism 73, which is similar to the usual differential gear mechanisms of automotive vehicles and includes a ring gear 74, a centrifuge device 75 rotated by rotation of the ring gear 74, and a switch contact member 76 actuated by the centrifuge 75 from a normal circuit-opening position to a circuit-closing position to effect simultaneous energization of the winding 61 of the relay 16 and the electromagnet 67 of the magnet valve device 17.

The ring gear 74 of the differential gear mechanism 73 is suitably journaled for rotation within the casing of the wheel-slip detector 18 and has attached thereto a housing 77 in which a shaft 78 is journaled at right angles to the axis of rotation of the ring gear 74. A pair of oppositely facing bevel pinion gears 79 are adapted to rotate on the shaft 78 and, meshing with the pinion gears 79, at diametrically opposite points, are a pair of bevel gears 81 suitably journaled in the housing 77. One of the gears 81 is rotated in one direction, in the manner to be presently described, according to the speed of rotation of the vehicle wheel 11, and the other is rotated in the opposite direction at a speed corresponding to vehicle speed.

The one gear 81 is rotated according to the speed of rotation of the vehicle wheel 11, in any suitable manner, as by a tracer wheel 83 suitably mounted on the car truck or car body and yieldably urged, as by springs 84, into frictional engagement with the rim of the vehicle wheel 11, the rotation of the tracer wheel 83 being effective through suitable bevel gears 86, to cause rotation of a flexible shaft 85 to which the one gear 81 is fixed. The other gear 81 is rotated according to the vehicle speed, as by another tracer wheel 88 suitably mounted on the car truck or car body and yieldingly urged into frictional contact with the track rail or road surface by springs 89, the rotation of the tracer wheel 88 being transmitted through bevel gears 92 to effect rotation of a flexible shaft 91, to which the gear 81 is fixed.

The centrifuge 75 comprises a rotary member 95 journaled in the casing and having a shaft 96 on which is fixed a bevel pinion gear 97 arranged to mesh with the ring gear 74.

Carried on the rotary member 95 are a plurality of pivoted levers 98, the outer ends of which carry weights, in the form of fly-balls 99, which are adapted to move radially outward by centrifugal action upon rotation of the rotary member 95. The inner ends of the levers 98 engage the lower face of a collar or flange 101 on a stem or rod 102 which carries the switch contact member 76 in insulated relation thereon. A yielding spring 103, which is interposed between a part of the rotary member 95 and the flange 101 on the stem 102, yieldingly urges the stem downwardly to effect disengagement of the contact member 76 from an associated fixed pair of contact fingers 105 to interrupt the energizing circuit for the relay 16 and magnet valve device 17.

When the rotary member 95 is rotated at a sufficient speed, the centrifugal force on the fly balls 99 overcomes the tension of the spring 103 and shifts the stem upwardly to effect circuit-closing engagement of the switch contact member 76 with the contact fingers 105.

The gear ratio between the ring gear 74 and the pinion gear 97 may be made sufficiently great that, for a relatively slow speed of rotation of the ring gear 74, a relatively high speed of the pinion gear 97 and consequently of the rotary member 95 of the centrifuge is effected. It will thus be seen that operation of the switch contact member 76 into circuit-closing position may be effected for a very few revolutions slip of the vehicle wheel 11 below a speed corresponding to vehicle speed and that therefore, the operative response of the equipment as hereinafter described follows almost instantaneously upon the initiation of slipping of the vehicle wheel.

Operation

In operation, assuming that the main reservoir 12 is charged to its normal pressure and that the vehicle is traveling along the road with the brakes released, an application of the brakes to a desired degree may be effected by operating the brake valve 13 to supply fluid under pressure from the main reservoir 12 to the brake cylinder 10 by way of the pipe 22, magnet valve device 17, pipe 65, chamber 39 of the inshot valve device 14, past the unseated check valve 33, through passage 41, chamber 36 and passage and pipe 37.

Simultaneously, fluid under pressure is also supplied from the pipe 22 to the chamber 25 at the left of the piston 24 in the inshot valve device 14 by way of the branch pipe 54, magnet valve device 16 and pipe 56. Thus, the pressure on opposite sides of the piston 24 being built up simultaneously, the spring 26 maintains the piston 24 in seated position on the shoulder seat 28 so that the check valve 33 is correspondingly held unseated to permit the rapid flow of fluid under pressure to the brake cylinder 10.

If it is desired to release the brakes following an application of the brakes in a manner just described, the operating handle 21 of the brake valve device 13 is returned to release position. Fluid under pressure is accordingly released simultaneously from the chamber 25 and the brake cylinder 10 into the pipe 22 and thence to atmosphere at the brake valve device 13.

Now let it be assumed that upon an application of the brakes, the vehicle wheel 11 begins to slip, that is, decelerate from a rotative speed corresponding to the speed of the vehicle. When the revolutions of slip of the vehicle wheel 11 exceeds a certain uniform low number, sufficient to cause the switch contact member 76 of the wheel-slip detector 18 to be actuated to circuit-closing position, the relay 16 and electromagnet 67 of the magnet valve device 17 are simultaneously energized. As a result of the energization of the relay 16, contact member 62 is rapidly shifted to circuit-closing position to effect energization of the electromagnet 49 of the magnet valve device 15, which accordingly results in the venting to atmosphere of the fluid under pressure from the chamber 25 at the left of the piston 24 in the inshot valve device 14.

The energization of the electromagnet 67 of the magnet valve device 17 establishes communication, in the manner previously described, through which fluid under pressure is released from the brake cylinder 10. Fluid under pressure is accordingly exhausted simultaneously from the chamber 25, at one side of the piston 24, and the chamber 36 open to the inner seated area of the piston 24 at substantially the same rate so that the spring 26 maintains the piston 24 in seated engagement on the shoulder seat 28 and thus maintains the check valve 33 unseated to permit the rapid release of fluid under pressure from the brake cylinder 10 therepast. If the pressure in the chamber 25 should be reduced more rapidly than the brake cylinder pressure acting on the inner seated area of the piston 24 in the chamber 36, the piston 24 may be shifted in the left-hand direction against the force of the spring 26 to permit the check valve 33 to seat on the rib seat 34. However, in such case, pressure of the fluid in the brake cylinder acting on the inner seated area of the check valve 33 in the passage 41 unseats the check valve 33 against the light resisting force of spring 35 so that the rapid release of fluid under pressure from the brake cylinder 10 is in no case interfered with. Furthermore, when the brake cylinder pressure reduces sufficiently, spring 26 becomes effective to return the piston 24 into seated relation on the shoulder seat 28 so that the check valve 33 is, in any case, unseated.

As a result of the rapid reduction in the brake cylinder pressure, and the consequent rapid release of the brakes on the vehicle wheel 11, the vehicle wheel will in most cases cease deceleration and begin to accelerate back toward a speed corresponding to vehicle speed within the slipping period, that is, before actually attaining the locked state. However, even though the vehicle wheel 11 should attain the locked state, it remains in such state only momentarily, due to the rapid reduction in the degree of the brake application.

As long as the vehicle wheel 11 slips more than a certain uniform low degree below a speed corresponding to vehicle speed, the switch contact member 76 remains in circuit-closing position to maintain the relay 16 and the magnet valve device 17 energized. When, following the automatic release of the brakes in the manner just described, the vehicle wheel again returns toward a speed corresponding to vehicle speed sufficiently that the number of revolutions of slip is less than the number sufficient to maintain the switch contact member 76 in circuit-closing position, the relay 16 and the magnet valve device 67 are deenergized. Due to the fact that the contact member 62 of the relay 16 remains in circuit-closing position for a predetermined uniform length of time following the deenergization of the winding 61 of the relay 16, the magnet valve device 15 remains energized to maintain the chamber 25 at the left of the piston 24 vented to atmosphere for a corresponding length of time. Upon the deenergization of the electromagnet 67 of the magnet valve device 17, however, the communication is reestablished through which fluid under pressure is resupplied from the pipe 22 to the brake cylinder 10 at a rapid rate past the unseated check valve 33 and through passage 41.

When the pressure in the brake cylinder and accordingly the pressure in the chamber 36 acting on the inner seated area of the piston 24 exceeds a certain uniform pressure such as, for example, fifteen to twenty pounds per sq. in. and sufficient to overcome the spring 26, the piston 24 is shifted in the left-hand direction sufficiently to cause the check valve 33 to seat on the annular rib seat 34 and cut off the further rapid supply of fluid under pressure from the chamber 39 to the chamber 36 and the connected brake cylinder 10 through the passage 41. Fluid under pressure continues to be supplied at a relatively slow rate from the chamber 39 to the chamber 36 and brake cylinder 10, however, through the restricted passage in the choke fitting 42.

When the contact member 62 of the relay 16 is shifted to circuit-opening position at the expiration of the delay interval of time following deenergization of the winding 61, the energizing circuit for the electromagnet 48 of the magnet valve device 15 is interrupted and consequently the magnet valve device 15 is operated to recharge chamber 25 with fluid under pressure from the supply pipe 22. Since the pressure established in the chamber 25 is, in such case, greater than the pressure in the brake cylinder 10 due to the relatively slow rate of build-up of brake cylinder pressure, it will be seen that the spring 26 thus becomes effective to shift the piston 24 in the right-hand direction into seated relation on the shoulder seat 28 to thereby effect unseating of the check valve 33 and again cause the rapid supply of fluid under pressure through the relatively large passage 41.

As previously stated, the interval of time which elapses before the contact member 62 of the relay 16 opens, following deenergization of the winding 61, may be of any desired length. If the deenergization of the magnet valve device 15 is effected after the car or train is brought to a complete stop, it will be seen that the reapplication of the brakes on the vehicle wheel 11, while the car or train is moving, is effected first at a rapid rate, until the brake cylinder pressure builds up to a certain uniform pressure, and thereafter at a desired restricted or relatively slow rate. After the vehicle is completely stopped and the magnet valve device 15 is deenergized, brake cylinder pressure will be built up at a rapid rate from the attained pressure to a pressure corresponding to that established in the supply pipe 22.

It will be apparent that by suitably selecting the flow area of the restricted passage 40 of the choke fitting 42 and having a sufficient time delay for shifting of the contact member 62 of the relay 16 to circuit-opening position, the brake cylinder pressure will not be restored, at the time the vehicle comes to a complete stop, higher than a pressure which is substantially lower than the pressure which initiated the slipping of the vehicle wheels. Thus, even if the coefficient of adhesion between the rim of the vehicle wheel and the road surface or rail does not improve and notwithstanding the reduced speed of rotation of the vehicle wheel, a recurrence of slipping of the vehicle wheel may be entirely prevented. However, should the wheel again begin to slip a second time following the reapplication of the brakes, the operation is again repeated so that at no time is the vehicle wheel 11 allowed to remain in a locked state so as to slide along the road surface or rail.

Obviously, the spring 26 may be of any desired strength and the restricted passage 40 of choke fitting 42 of any desired flow area so that the cut-off of the initial rapid rate of reapplication of the brakes may occur at any desired brake cylinder pressure and so that the subsequent build-up of brake cylinder pressure may occur at any desired relatively slow rate.

Furthermore, the time interval which elapses before the contact member 62 shifts to circuit-opening position following the deenergization of the relay 16 may be such that the final inshot or rapid supply of fluid under pressure to the brake cylinder may occur prior to the vehicle or car coming to a complete stop.

While but one embodiment of our invention has been described, it will be apparent that various modifications, omissions or additions may be made in the embodiment shown without departing from the spirit of the invention. It is not our intention, therefore, to limit the scope of our invention except as it is necessitated by the scope of the prior art.

Having now described our invention, what we claim as new and desire to secure by Letters Patent, is:

1. The method of operating vehicle wheel brakes which comprises effecting an application of the brakes, reducing the braking force at a rapid rate, upon the slipping of a vehicle wheel, for causing the wheel to return toward a speed corresponding to vehicle speed and cease slipping, restoring the braking force at a relatively rapid rate when the vehicle wheel substantially ceases to slip until a certain uniform degree of braking force is attained, and thereafter further restoring the braking force at a relatively slow rate.

2. The method of operating vehicle wheel brakes which comprises effecting an application of the brakes, reducing the braking force at a rapid rate, upon the slipping of a vehicle wheel, for causing the wheel to return toward a speed corresponding to vehicle speed and cease slipping, restoring the braking force at a relatively rapid rate when the vehicle wheel substantially ceases to slip until a certain uniform degree of braking force is attained, effecting further restoration of the braking force at a relatively slow rate for a limited time, and finally effecting restoration of the braking force at a relatively rapid rate to the original degree which initiated the slipping of the wheels.

3. A vehicle brake system comprising means for effecting an application of the brakes, means effective upon the slipping of a vehicle wheel for effecting a rapid reduction in the braking force so as to cause the wheel to return toward a speed corresponding to vehicle speed and to cease slipping, and means effective when the vehicle wheel substantially ceases to slip for restoring braking force at a rapid rate until a certain uniform degree of braking force is attained and operative when such certain degree of braking force is attained for causing the rate of restoration of the braking force to be restricted thereafter to a relatively slow rate.

4. A vehicle brake system comprising means for effecting an application of the brakes with a certain degree of braking force, means operative upon the slipping of a vehicle wheel for effecting a rapid reduction in the braking force to cause the vehicle wheel to return toward a speed corresponding to vehicle speed and cease slipping, and operative when the vehicle wheel substantially ceases to slip for effecting restoration of braking force, and means effective when a certain uniform degree of braking force is restored for preventing further increase in the braking force except at a relatively slow rate.

5. A vehicle brake system comprising means for effecting an application of the brakes with a certain degree of braking force, means operative upon the slipping of a vehicle wheel for effecting a rapid reduction in the braking force to cause the vehicle wheel to return toward a speed corresponding to vehicle speed and cease slipping, and operative when the vehicle wheel substantially ceases to slip for effecting restoration of braking force, means effective when a certain uniform degree of braking force is restored for preventing further increase in the braking force except at a relatively slow rate, and means effective a certain uniform length of time after the vehicle wheel returns substantially to a speed corresponding to vehicle speed for rendering said last means ineffective to prevent restoration of braking force at a rate faster than said relatively slow rate.

6. A vehicle brake system comprising a brake cylinder, a communication through which fluid under pressure may be rapidly supplied to the brake cylinder to effect an application of the brakes, a check valve normally unseated to permit the supply of fluid under pressure through said communication and adapted when seated to prevent the supply of fluid under pressure through said communication to the brake cylinder while permitting reverse flow of fluid under pressure therepast from the brake cylinder, a movable abutment subject on one side to the pressure in the brake cylinder and on the opposite side to the pressure in a chamber, means effective as long as a vehicle wheel does not slip to permit the supply of fluid under pressure through the said communication to the brake cylinder and operative upon the slipping of the vehicle wheel to prevent the supply of fluid under pressure therethrough to the brake cylinder and to establish communication through which fluid under pressure is released from the brake cylinder, means effective as long as the wheel does not slip to establish communication through which fluid under pressure may be supplied to said chamber at a pressure corresponding to brake cylinder pressure and operative upon slipping of a vehicle wheel to effect a reduction of the pressure of the fluid in said chamber, said abutment being responsive to the reduction of the pressure of the fluid in said chamber to cause seating of the said check valve, and means providing a restricted communication through which fluid under pressure may be supplied through the said communication to the brake cylinder at a relatively slow rate while said check valve is seated.

7. A vehicle brake system comprising a brake cylinder, a communication through which fluid under pressure may be rapidly supplied to effect an application of the brakes, a check valve normally unseated to permit the supply of fluid under pressure through said communication and adapted when seated to prevent the supply of fluid under pressure through said communication to the brake cylinder while permitting reverse flow of fluid under pressure therepast from the brake cylinder, a movable abutment subject on one side to the pressure in the brake cylinder and on the opposite side to the pressure in a chamber and moved in response to a certain uniform differential of brake cylinder pressure over the pressure in said chamber to cause seating of said check valve, means effective as long as a vehicle wheel does not slip to permit the supply of fluid under pressure through the said communication to the brake cylinder and operative upon the slipping of the vehicle wheel to prevent the supply of fluid under pressure therethrough to the brake cylinder and to establish communication through which fluid under pressure is released from the brake cylinder, means effective as long as the wheel does not slip to establish communication through which fluid under pressure may be supplied to said chamber at a pressure corresponding to brake cylinder pressure and operative upon slipping of a vehicle wheel to effect a reduction of the pressure of the fluid in said chamber, said abutment being effective to maintain said check valve unseated when brake cylinder pressure and the pressure in said chamber are simultaneously reduced, means providing a restricted communication through which fluid under pressure may be supplied through the said communication to the brake cylinder at a relatively slow rate while said check valve is seated, and means effective for a certain uniform time after a vehicle wheel substantially ceases to slip for causing said chamber to remain vented while fluid under pressure is being resupplied to the brake cylinder whereby said abutment is shifted to cause seating of said check valve and effective upon the expiration of said certain uniform time for causing fluid under pressure to be supplied to said chamber to cause said abutment to be shifted to effect unseating of said check valve and the consequent opening of said communication to enable the rapid supply of fluid under pressure to the brake cylinder.

8. A vehicle brake system comprising a brake cylinder, means normally conditioned as long as a vehicle wheel does not slip to establish communication through which fluid under pressure may be supplied to the brake cylinder to effect application of the brakes, means variously conditionable to control the rate of supply of fluid under pressure through the said communication to the brake cylinder, and means effective as long as the vehicle wheel does not slip for conditioning the said variously conditionable means to permit the supply of fluid under pressure through said communication at a rapid rate and effective upon the slipping of the vehicle wheel to condition the said variously conditionable means to restrict the supply of fluid under pressure through the said communication to the brake cylinder to a relatively slow rate as long as the brake cylinder pressure exceeds a certain uniform pressure.

9. A vehicle brake system comprising a brake cylinder, means normally conditioned as long as the vehicle wheel does not slip to establish communication through which fluid under pressure may be supplied to the brake cylinder to effect application of the brakes, means variously conditionable to control the rate of supply of fluid under pressure through the said communication to the brake cylinder, means effective as long as the vehicle wheel does not slip for conditioning the said variously conditionable means to permit the supply of fluid under pressure through said communication at a rapid rate and effective upon the slipping of the vehicle wheel to condition the said variously conditionable means to restrict the supply of fluid under pressure through the said communication to the brake cylinder to a relatively slow rate when the brake cylinder pressure increases above a certain uniform pressure, and means effective upon the elapse of a certain uniform time after the vehicle wheel substantially ceases to slip for rendering said last means ineffective to condition the variously conditionable means to thereafter restrict the supply of fluid under pressure through said communication to the brake cylinder to a relatively slow rate.

10. A vehicle brake system comprising a brake cylinder, means normally conditioned as long as a vehicle wheel does not slip in excess of a certain degree below a speed corresponding to vehicle speed for establishing a communication through which fluid under pressure may be supplied to the brake cylinder to effect application of the brakes and operative when the vehicle wheel slips in excess of said certain degree for cutting off the supply of fluid under pressure through said communication and for establishing communication through which fluid under pressure is released from the brake cylinder so as to cause the vehicle wheel to return toward a speed corresponding to vehicle speed and cease to slip in excess of said certain degree, a check valve adapted when seated to prevent the supply of fluid under pressure through said communication to the brake cylinder but adapted to permit the release of fluid under pressure from the brake cylinder therepast under the control of said last means, a movable abutment normally biased to a position to effect unseating of the check valve, said abutment being subject on one side to brake cylinder pressure and on the opposite side to the pressure in a chamber, means normally effective to establish communication through which fluid under pressure is supplied to the said chamber to a degree corresponding to brake cylinder pressure upon an application of the brakes and operative when the vehicle wheel slips in excess of said certain degree to vent fluid under pressure from said chamber, means for causing said last means to maintain the said chamber vented for a certain uniform length of time following the return of the vehicle wheel to a speed having less than said certain degree of slip, said abutment being shifted to effect seating of the check valve and the consequent shutting off of the rapid resupply of fluid under pressure to the brake cylinder when the brake cylinder pressure attains a certain uniform pressure, and means effective when said check valve is seated to provide communication through which fluid under pressure may be supplied through said communication to the brake cylinder at a relatively slow rate.

11. A vehicle brake system comprising a brake cylinder, a pipe chargeable with fluid under pressure to a desired degree to initiate an application of the brakes, a valve device normally establishing communication through which fluid under pressure is supplied from said pipe to the said brake cylinder and operative when a vehicle wheel slips in excess of a certain degree below a speed corresponding to vehicle speed for cutting off the connection between the said pipe and the brake cylinder and establishing communication through which fluid under pressure is released from the brake cylinder at a rapid rate, means providing a first communication through which fluid under pressure may be rapidly supplied to and released from the brake cylinder under the control of said valve device, means providing a second communication through which fluid under pressure may be supplied at a relatively slow rate under the control of said valve device, a check valve effective in seated position to prevent the supply of fluid under pressure through the said first communication to the brake cylinder, movable abutment means subject to the opposing forces of brake cylinder pressure and the pressure in a chamber, biasing means constantly exerting a force on said abutment in opposition to the brake cylinder pressure for causing said abutment means to hold the check valve unseated when brake cylinder pressure and the pressure in said chamber are substantially equal and effective to also hold the check valve unseated when fluid under pressure is vented from said chamber and as long as the brake cylinder pressure does not exceed a certain uniform pressure, a valve device normally effective to establish communication through which fluid under pressure is supplied to the said chamber to a pressure corresponding substantially to that in the brake cylinder upon an application of the brakes and operative when the vehicle wheel slips in excess of said certain degree to vent fluid under pressure from said chamber, and means for preventing said valve device from causing fluid under pressure to be supplied to said chamber for a certain uniform time following the return of the vehicle wheel to a speed having less than said certain degree of slip.

12. A vehicle brake system comprising a brake cylinder, means providing a relatively large passage through which fluid under pressure may be rapidly supplied to the brake cylinder and rapidly released from the brake cylinder, means providing a relatively small passage through which fluid under pressure may be supplied to the brake cylinder and released from the brake cylinder only at a relatively slower rate, means effective to establish communication through which fluid under pressure is supplied to the brake cylinder through the relatively large passage and the relatively small passage as long as a vehicle wheel does not slip in excess of a certain degree below a speed corresponding to vehicle speed and operative to cut off the supply of fluid under pressure to the brake cylinder and to establish communication through which fluid under pressure is released from the brake cylinder as long as the vehicle wheel slips in excess of said certain degree, a check valve effective when in seated position to close communication through the relatively large passage, means effective to cause said check valve to be unseated as long as the vehicle wheel does not slip in excess of said certain degree, and means effective once the vehicle wheel slips in excess of said certain degree below a speed corresponding to vehicle speed for causing the check valve to be seated for a certain length of time after the brake cylinder pressure is restored to a pressure in excess of a certain uniform pressure.

EARLE S. COOK.
CHARLES F. HAMMER.